Patented Dec. 16, 1924.

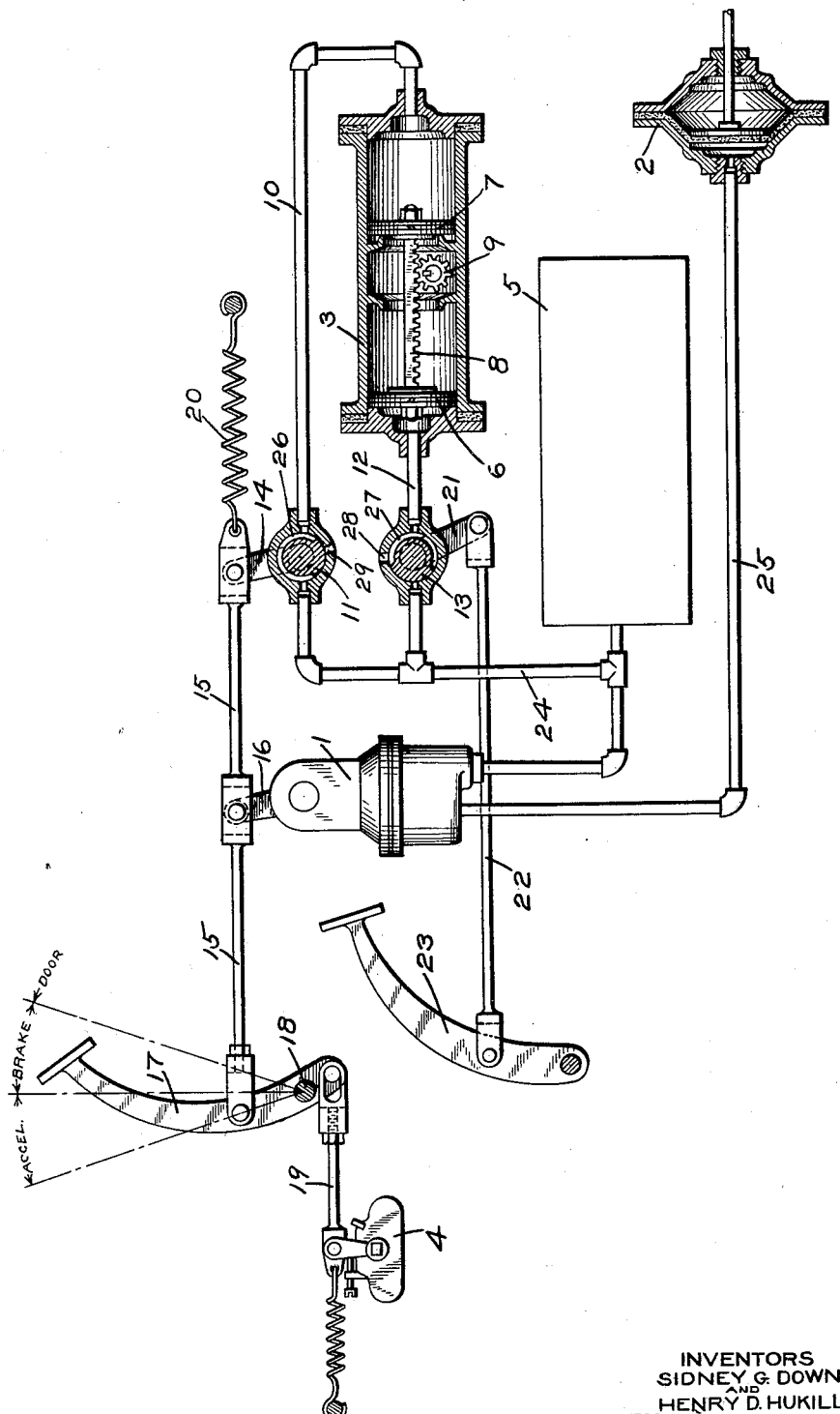

1,519,121

UNITED STATES PATENT OFFICE.

SIDNEY G. DOWN AND HENRY D. HUKILL, OF PITTSBURGH, PENNSYLVANIA, ASSIGNORS TO THE WESTINGHOUSE AIR BRAKE COMPANY, OF WILMERDING, PENNSYLVANIA, A CORPORATION OF PENNSYLVANIA.

MOTOR VEHICLE CONTROL DEVICE.

Application filed March 14, 1924. Serial No. 699,376.

*To all whom it may concern:*

Be it known that we, SIDNEY G. DOWN and HENRY D. HUKILL, both citizens of the United States, and residents of Pittsburgh, in the county of Allegheny and State of Pennsylvania, have jointly invented certain new and useful Improvements in Motor Vehicle Control Devices, of which the following is a specification.

This invention relates to motor vehicle controlling devices for controlling the brakes, the power, and the doors.

The principal object of our invention is to provide improved controlling means whereby the control of the brakes, the power, and the car doors are interlocked.

In the accompanying drawing, the single figure is a diagrammatic view of a motor vehicle controlling apparatus, embodying our invention.

As shown in the drawing, a brake controlling valve device 1 is provided for controlling the admission and release of fluid under pressure to and from a brake chamber 2, a fluid pressure door engine 3, an accelerator 4, and a reservoir 5, adapted to be charged with fluid under pressure.

The door engine 3 may comprise a casing containing pistons 6 and 7 connected together by a rack bar 8 which is adapted to operate a pinion 9 for effecting the opening and closing of the car doors. Interposed in pipe 10, leading to the door closing piston 7 is a valve device having a rotary valve 11 and interposed in pipe 12 leading to the door opening piston 6 is a valve device having a rotary valve 13.

The valve 11 is provided with an operating arm 14 which is pivotally connected to an operating rod 15. The brake controlling valve device 1 is provided with an operating arm 16 which is also pivotally connected to the rod 15. A pedal lever 17 mounted on a fulcrum pin 18 is pivotally connected to the rod 15 and also connected to the pedal lever 17 is a rod 19 for operating the accelerator 4. A coil spring 20 is connected to rod 15 and constantly tends to move same toward the right.

The valve 13 is provided with an operating arm 21 which is operatively connected through a rod 22 with the usual engine clutch lever 23 of the motor vehicle.

In operation, with the control pedal lever 17 in the position shown in the drawing, the valve 11 is in position such that cavity 26 therein connects pipe 10 with fluid supply pipe 24, so that fluid under pressure is supplied to the door closing piston 7 of the door engine 3, so that the car doors are held closed, and the clutch lever 23 being in its clutch engaged position, the valve 13 connects pipe 12, through a cavity 27 with an exhaust port 28.

The brake controlling valve device 1 is now held in release position, so that fluid is exhausted from the brake chamber 2 through pipe 25 and an exhaust port in the brake controlling valve device. In this position, the accelerator 4 is in its idling position and if it is desired to accelerate the motor, the pedal lever 17 is pushed toward the left. In this movement the arrangement of the brake controlling valve device 1 and the valve 11 is such that no change is effected, the car doors being held closed and the brakes being held released.

If it is desired to apply the brakes, the pedal lever 17 is allowed to move toward the right from the position shown in the drawing, this movement being effected by the spring 20. The operating arm 16 is thus operated to shift the brake controlling valve to a position for supplying fluid under pressure to the brake chamber 2, for effecting an application of the brakes.

During this movement, the rotation of the valve 11 will not effect any change in fluid pressure on the door engine 3, but if it is desired to open the car doors, a further movement of the pedal lever 17 toward the right is permitted, so as to connect pipe 10 through cavity 26 with exhaust port 29, thus exhausting the fluid pressure on the door closing piston 7. When the clutch lever 23 is depressed to disengage the engine clutch, the valve 13 is rotated to a position for connecting pipe 24 through cavity 27, with pipe 12, so that fluid under pressure is supplied to the door opening piston 6 to thereby effect the opening of the car doors. During this movement, the arrangement of the brake controlling valve device 1 is such that the brakes are held applied as the movement of the arm 16 toward the right is continued.

When the clutch lever 23 is released and allowed to return to its normal position, the pipe 12 is again connected, through the valve 13 with the exhaust, and since the door closing piston 7 is at this time also at atmospheric pressure, the door engine will be balanced as to fluid pressure and the car doors may be allowed to remain in the door open position or they may be manually closed, if desired.

If the operator should become incapacitated while the car is running, the release of the control pedal lever 17 will at once operate to cut off power by moving the accelerator 4 to its idling position, the brakes will be applied by operation of the brake controlling valve device 1, and the fluid pressures on the door engine 3 will be balanced, permitting the car doors to be manually opened, since the operation of the valve 13 will connect the door closing piston 7 with the atmosphere, while the clutch pedal 23, not having been operated, will be in the position shown in the drawing, in which the door opening piston 6 is connected to the atmosphere.

Having now described our invention, what we claim as new and desire to secure by Letters Patent, is:—

1. In a motor vehicle controlling mechanism, the combination with a fluid pressure brake controlling valve device and a fluid pressure door engine, of a valve having one position for supplying fluid to the door closing side of said engine and another position for venting fluid therefrom, and a foot operated lever for operating said brake controlling valve device and said door controlling valve.

2. In a motor vehicle controlling mechanism, the combination with a fluid pressure brake controlling valve device and a fluid pressure door engine, of a valve for controlling the fluid pressure on the door closing side of said door engine, a foot operated lever for operating said brake controlling valve device and said door controlling valve, an engine clutch lever, and a valve operated by said lever for controlling the fluid pressure on the door opening side of said door engine.

3. In a motor vehicle controlling mechanism, the combination with a fluid pressure brake controlling valve device and a fluid pressure door engine, of a valve for controlling the fluid pressure on the door closing side of said door engine, a valve for controlling the fluid pressure on the door opening side of the door engine, a manually operable lever, means for operating said brake controlling valve device to apply the brakes, and said door closing valve to vent fluid from the door closing side of the door engine, upon release of said manually operated lever, and an engine clutch lever for operating said door opening valve.

In testimony whereof we have hereunto set our hands.

SIDNEY G. DOWN.
HENRY D. HUKILL.